United States Patent [19]
Mitchell et al.

[11] Patent Number: 5,623,833
[45] Date of Patent: Apr. 29, 1997

[54] SYSTEM AND METHOD FOR RECOVERING AND SEPARATING NON-CONDENSING GASES FROM A HALOCARBON COMPOSITION

[75] Inventors: Mark D. Mitchell, Wilson, N.C.; Donald P. Sparks, Maumee; Howard K. Thompson, Toledo, both of Ohio

[73] Assignee: FRC International Inc., Holland, Ohio

[21] Appl. No.: 670,012

[22] Filed: Jun. 25, 1996

[51] Int. Cl.$^6$ .................................................. F25B 47/00
[52] U.S. Cl. .............................. 62/85; 62/430; 62/195; 62/292
[58] Field of Search ........................ 62/195, 149, 475, 62/292, 430, 434, 431, 438, 617, 910, 77, 85; 165/154, 177

[56] References Cited

U.S. PATENT DOCUMENTS

| | | | |
|---|---|---|---|
| 4,984,431 | 1/1991 | Mount et al. | 62/85 |
| 5,150,577 | 9/1992 | Mitchell et al. | 62/18 |
| 5,189,881 | 3/1993 | Miles | 62/292 |
| 5,263,326 | 11/1993 | Block et al. | 62/18 |
| 5,269,148 | 12/1993 | Ludwig | 62/149 |
| 5,327,735 | 7/1994 | Hatton | 62/292 |

*Primary Examiner*—John M. Sollecito
*Attorney, Agent, or Firm*—Brinks Hofer Gilson & Lione

[57] ABSTRACT

A high efficiency, high rate system for recovering and removing non-condensable gases from a halocarbon composition. A collection tank with an integral heat exchanger unit is submerged in a liquid heat transfer medium and coupled to the halocarbon composition. Refrigerant injected into the heat transfer medium cools the heat exchanger unit and collection tank allows the separation of gases from the liquid phase of the halocarbon composition. The gases contained within the liquid phase are separated from the halocarbon composition by reducing pressure in the vapor (ullage) space of the collection tank. This vapor stream mixture of released gases pass through a flow control orifice that further cools the vapor stream condensing more liquid phase halocarbon from the mixture. This additional liquid separates from the vapor phase mixture and collects into a liquid trap arrangement of coaxial and helical geometry. The nitrogen and other non-condensable gases are vented from the outer large chamber of the liquid trap arrangement and are accumulated to pressurize the outer chamber of the liquid trap arrangement with additional transfer gas, if required. This pressure transfers the liquid phase halocarbon collected in the liquid trap arrangement back into the collection tank and into a receiver external to the system.

26 Claims, 7 Drawing Sheets

SYSTEM AND METHOD FOR RECOVERING AND SEPARATING NON-CONDENSING GASES FROM A HALOCARBON COMPOSITION

BACKGROUND OF THE INVENTION

1. Field of the Invention

The invention relates in general to a system and method for removing dissolved gases from the liquid and vapor phase of a halocarbon composition, and in particular, for removing nitrogen and other non-condensable gas at high process efficiencies and at high process rates from liquid and vapor phase halocarbon.

2. Related Art

During the past decade, much attention has been focused on the earth's ozone layer. The ozone layer is essential to protect the earth from harmful ultraviolet radiation. The thinning of the earth's ozone layer results in more harmful ultraviolet radiation reaching the earth's surface.

One of the causes of ozone depletion is the release of Ozone Depleting Substances (ODS's) into the atmosphere. For instance, Halon® is in the class of the ODS's since it contains some of the key halogens that cause ozone depletion. However, halocarbon compositions are essential for fire protection in existing proven fire fighting and fire suppression systems. Until suitable replacements can be found, it is necessary to continue the use of the halocarbon compositions in order to maintain protection against fire hazards.

As replacement agents are found it will be necessary to destroy the halocarbon compositions in a manner which is safe for the environment. The destruction process must result in rendering the halogen components from the halocarbon composition molecule "harmless" to the environment. In this effort of destruction, it is also necessary to remove the non-condensable gases, especially nitrogen, widely used in the fire suppression industry as a pressurizing media for fire suppression containers containing halocarbon compositions, such as Halon® and other fire suppression compounds. Removal of nitrogen rapidly and at a high volume rate for a process flow including halocarbon compositions requires high rates of heat transfer and also requires that the physical process control be performed through computer means.

Many conventional halocarbon composition recovery, recycle, and reclamation systems appearing on the market in the past decade are not designed to be computer interactive and do not perform nitrogen and other non-condensable gas separation at high rates, and in particular, at high process efficiencies at high process rates. No conventional system on the market is self optimizing through computer process modeling where the process determines the phase of the mixture to be recovered and treated based on pressure and temperature of the halocarbon and dissolved gas mixture within the source vessel.

In the invention, the unique design of the heat exchanger unit of the invention achieves heat transfer efficiency beyond that of similar conventional equipment previously developed. For example, the invention provides a high rate process efficiency of approximately 99% for Halon® 1211 and approximately 98% for Halon® 1301 and is a vast improvement on previous process systems and methods. In addition, the invention can be practiced with other halocarbon compositions. The invention can also be used with other replacement agents in the same manner as it is used with the Halon® 1211 and Halon® 1301. Since replacement agents are very expensive, the invention will be beneficial to minimizing the unnecessary release of the replacement agents due to its high rate of process and high process efficiency. As a result, the invention reduces the consumption of replacement agents, thereby reducing the end user cost and minimizes the impact to the global environment.

SUMMARY OF THE INVENTION

It is an object of the invention to provide a halocarbon process system and method for recovery of halocarbon compounds and removal of non-condensable gases from a halocarbon composition.

In a preferred embodiment of the invention, the recovery and non-condensable gas separation system includes a heat exchanger unit filled with a liquid heat transfer medium. A heat exchanger unit provides a means for cooling the process stream. The heat exchanger unit is submerged in the liquid heat transfer medium. Both the heat transfer medium and the heat exchanger unit with integral collection tank is maintained well below the atmospheric pressure boiling point of the halocarbon composition being collected by injecting refrigerant. An inlet means of a dual liquid and vapor pump arrangement is provided for transferring the halocarbon composition from a source into the collection tank. As the halocarbon composition passes through the heat exchanger unit into the collection tank, the process stream cools and liquefies the halocarbon composition in the process stream. The liquid phase halocarbon is injected into the lower portion of the tank through a perforated input tube resident within the collection tank. As the liquid phase halocarbon accumulates within the collection tank, a layer of non-condensable gases and vapor phase halocarbon forms above the liquid phase halocarbon. Once the collection tank fills to a predetermined level with liquid phase halocarbon, a vapor stream mixture comprising a mixture of non-condensable gases and vapor phase halocarbon is vented from the top of the collection tank into a separation means or separator mechanism for separating residual halocarbon from the vapor stream mixture. This is accomplished by passing the vapor stream mixture through a flow control orifice connected to the inner tube of a coaxial, helical liquid trap arrangement resident within the liquid heat transfer medium. As it passes from the collection tank, through the flow control orifice, and into the liquid trap arrangement, the flow control orifice causes additional liquid phase halocarbon to be extracted from the vapor stream mixture. Pressure drop across the flow control orifice expands the vapor stream mixture inducing further cooling of the vapor stream mixture. This pressure drop and associated temperature reduction in the vapor stream mixture further liquifies residual halocarbon from the vapor stream mixture, thereby removing additional liquid phase halocarbon from the vapor stream mixture. Concurrently, the non-condensable gases are released through the outer coaxial tube of the liquid trap arrangement permitting residual liquid phase halocarbon to be collected in the lower portion of the outer coaxial tube and returned to the collection tank during liquid transfer.

In a preferred embodiment of the invention, a flow control orifice is disposed in the liquid trap arrangement. A pump means compresses the non-condensable gases contained in the vapor stream mixture that pass through the liquid trap arrangement. The additional pressure drop generated across the flow control orifice by the pump means further cools the vapor stream mixture thereby enhancing the process efficiency beyond nominal performance. The separated non-condensable gas, such as nitrogen, and other trace non-condensable gases are stored in a pressure buffer for use in performing pressure transfer of the liquid phase halocarbon from the liquid trap arrangement and from the collection tank. To avoid excessive pressure buildup and maintain a low pressure within the collection tank during collection of liquid phase halocarbon, the collection tank is vented through the liquid trap arrangement using predetermined pressure parameters controlled by an interactive computer system.

In another preferred embodiment of the invention, the collection tank includes a perforated sheet arrangement comprising a plurality of internal partitions of perforated sheets to enhance the removal of non-condensable gases from the liquid phase halocarbon. The process stream is imposed onto one perforated sheet of the perforated sheet arrangement through an input tube and mechanically agitates the liquid phase halocarbon. This mechanical agitation further removes non-condensable gases prior to the transfer of the collected liquid phase halocarbon from the collection tank. The perforations along the input tube are located in at least two distinct sections relative to the level of liquid phase halocarbon within the collection tank to prevent backflow of the liquid phase halocarbon into the heat exchanger unit during the pressure transfer of the liquid phase halocarbon. The perforated sheet arrangement also serves as an additional heat transfer means and entrainment means during the transport of vapor phase halocarbon into the vapor stream mixture and into the coaxial liquid trap arrangement during gas separation.

These and other aspects and advantages of the invention are described or apparent from the following detailed description of the preferred embodiments and appended drawings wherein like reference numbers refer to the same element, feature or component.

BRIEF DESCRIPTION OF THE DRAWINGS

The preferred embodiments are described with reference to the drawings in which.

DETAILED DESCRIPTION OF THE PREFERRED EMBODIMENTS

Figure 1:
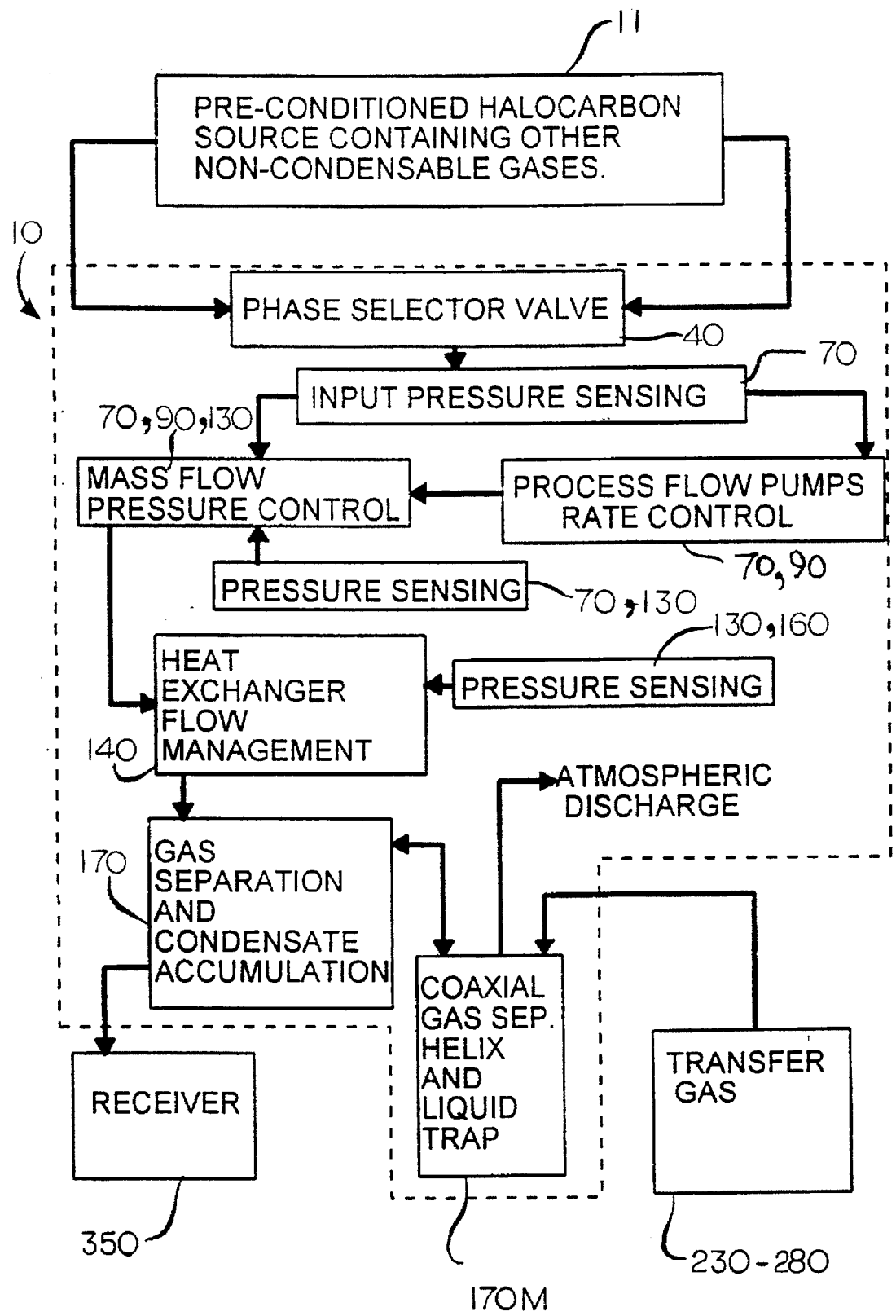
FIG. 1 is a block diagram of the high rate and highly process efficient halocarbon recovery and non-condensable gas separation system.

FIG. 1 shows a block diagram of the high rate, high efficiency halocarbon recovery and non-condensable gas separation system according to a first preferred embodiment of the invention.

In general, the system 10 recovers halocarbon from a source 11 containing a halocarbon composition of liquid and vapor phase halocarbon and non-condensable gases. The source 11 must first be pre-conditioned by filtering and drying (removal of water content to below predetermined levels based upon the halocarbon being processed) to prevent abnormal operation of the system 10. A three-way valve 40 or phase selector valve maximizes the process rate through the system 10 by selecting source 11 or process stream as either being liquid phase or vapor phase halocarbon. A thermocouple 30 measures the temperature of source 11 and a pressure transducer 70 measures the pressure of source 11.

If the pressure at pressure transducer 70 exceeds a predetermined pressure of approximately 175 psi, then solenoid valve 90 acts together with solenoid valve 140 and stops flow to heat exchanger unit 170A which optimizes the process. In this arrangement, the flow to the dual pump arrangement 100 is bypassed and the pressure is sensed by pressure transducers 130, 160. When solenoid valve 90 closes, flow occurs through check valve 80 and cross connector 120 as the input pressure of the source 11 is high enough for the system 10 to operate at the design capacity of heat exchanger unit 170.

If the pressure at pressure transducer 70 is less than a predetermined pressure of approximately 150 psi, then solenoid valve 90 opens and acts together with the pump arrangement 100 and solenoid valve 140. Thus, pump arrangement 100 provides a means for increasing process flow rate during low pressure at pressure transducer 70 and solenoid valve 140 provides a means for managing flow through the heat exchanger unit 170A.

A halocarbon composition of liquid and vapor phase halocarbon and non-condensable gases accumulates or collects in collection tank 170B. The collection tank 170B fills with liquid and vapor phase halocarbon and non-condensable gases until a predetermined pressure of approximately 110 psi is reached at pressure transducer 180. When the pressure exceeds approximately 110 psi, the solenoid valve 90 and pump drive air valve (not shown) close and solenoid valve 200 opens until pressure transducer 180 indicates a predetermined pressure of approximately 30 psi. The arrangement of flow control orifices 170G and 210, in conjunction with heat exchanger unit 170A, form a predetermined pressure balancing circuit allowing the pressure drop at pressure transducer 180 to decrease more rapidly than the pressure drop at pressure transducer 160. Consequently, the solenoid valve 140 remains open during the gas separation phase permitting the residual liquid phase halocarbon within the lower portion of the heat exchanger unit 170A to enter the collection tank 170B.

Flow control orifice 170G removes vapor phase halocarbon from the vapor stream mixture because a pressure drop generated by flow control orifice 170G further cools the vapor stream mixture and allows for further recovery of residual liquid phase halocarbon from the vapor phase. Flow control orifice 170G is connected to a small diameter tube disposed within a larger diameter tube forming a coaxial, helical liquid trap arrangement 170M, 180, 190, 200, 210, 220 (See FIGS. 2 and 3). The liquid phase halocarbon collects in the lower portion of the helical geometry and returns to collection tank 170B during the liquid transfer mode. During the liquid transfer mode, transfer gas is released through flow control valve 200, flow control orifice 210 and exhaust silencer 220 upon indication of low liquid level by the liquid level measurement system 170c. When pressure transducer 160 actuates at liquid level and at low pressure during the gas separation cycle, the liquid transfer mode begins. During the liquid transfer phase, the pressure increase in collection tank 170B forces the condensed liquid phase halocarbon, such as Halon 1211® and Halon 1301®, out of collection tank 170B, through valves 290, 300, through check valve 310 and through output hose 340 and into receiver 350.

Figure 2:
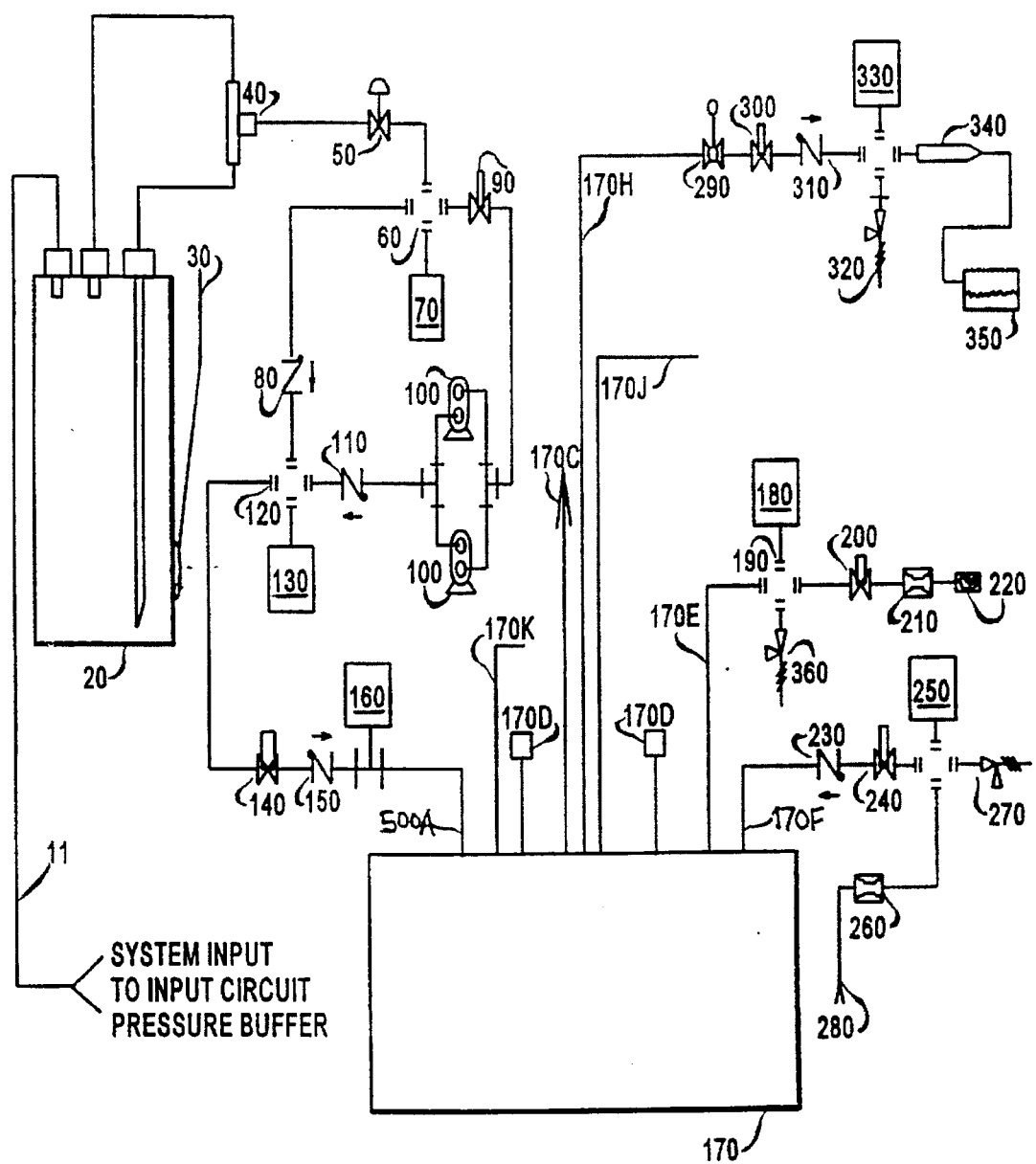
FIG. 2 is a detailed schematic diagram of the high rate and highly process efficient halocarbon recovery and non-condensable gas separation system of FIG. 1.

FIG. 2 shows a detailed schematic diagram of the high rate, high efficiency halocarbon recovery and non-condensable gas separation system according to a first preferred embodiment of the invention. The system 10 recovers halocarbon compositions and non-condensabe gases from a source 11 containing halocarbon and non-condensable gases. Source 11 enters the system 10 and flows into an input system pressure buffer 20. The temperature of source 11 is measured by means of a thermocouple 30 positioned on the lower section of the pressure buffer 20 and the pressure is measured by means of a pressure transducer 70. An interactive computer system (not shown) receives the signals from thermocouple 30 and pressure transducer 70 and controls a phase-selector valve or three-way valve 40. Three-way valve 40 selects the input process stream or source 11 from pressure buffer 20 as either being liquid phase or vapor phase in order to maximize the process rate through the system 10. The output from the three-way valve 40 enters the system 10 through a main input hand valve 50 and a cross connector 60.

A pressure exceeding a predetermined pressure of approximately 175 psi at pressure transducer 70 causes solenoid valve 90 to close stopping flow to dual pump arrangement 100. Pump arrangement 100 is not required when pressure at cross connector 60 is above the predetermined pressure of approximately 175 psi. Flow occurs through check valve 80 and through cross connector 120 when solenoid valve 90 is closed because the input pressure is high enough for the process to continue at the design capacity of heat exchanger unit 170A. The operation of pump arrangement 100 is a means of maintaining a reasonable process rate during low pressure at pressure transducer 70.

Solenoid valve 140 controls flow into heat exchanger unit 170A as required in order to optimize process efficiency of the system 10. Solenoid valve 90 and solenoid valve 140 operate together whenever pressure at pressure transducer 70 is less than a predetermined pressure of approximately 150 psi.

Pressure transducer 130 measures pressure before solenoid valve 140 at cross connector 120. Process flow continues through check valve 150 and pressure transducer 160 measures pressure immediately after check valve 150.

Figure 3:
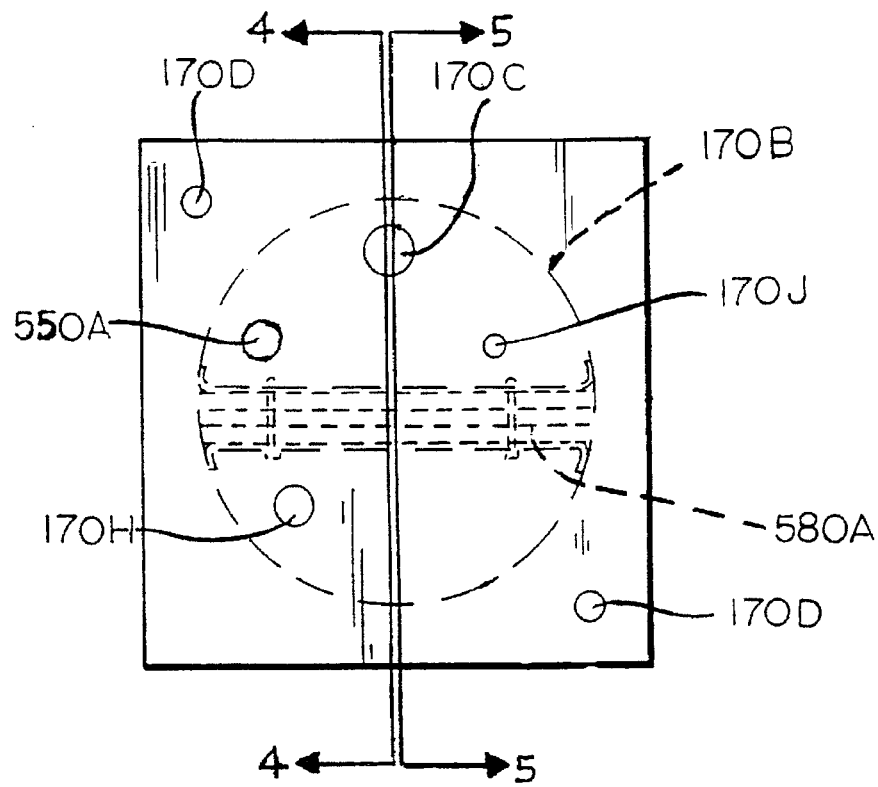
FIG. 3 is a top view of the collection tank partition arrangement and process input/output arrangement.
Figure 4:
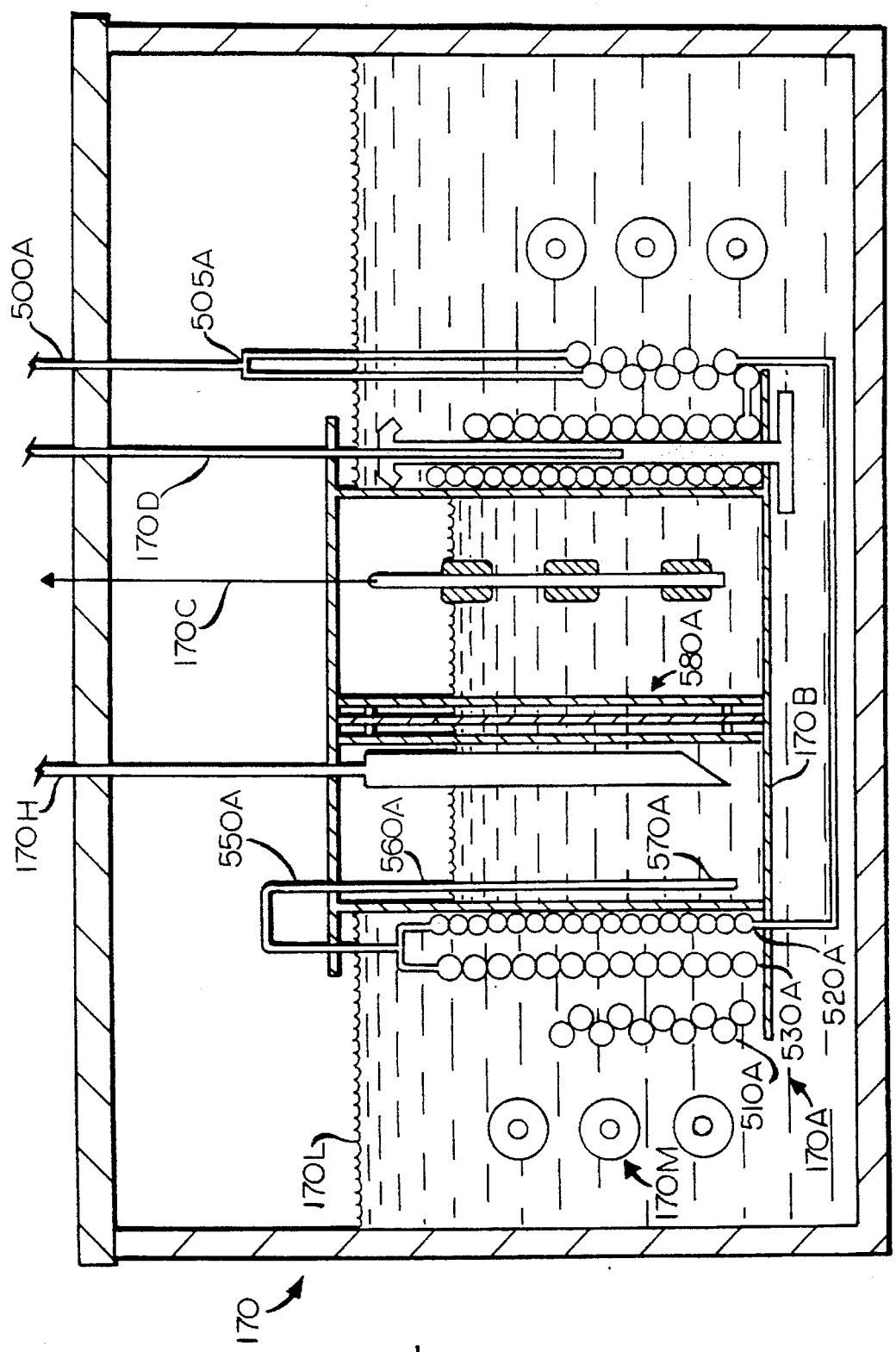
FIG. 4 is an elevation view of the heat exchanger unit and collection tank with input tube with perforations taken along lines 4—4 of FIG. 3.
Figure 5:
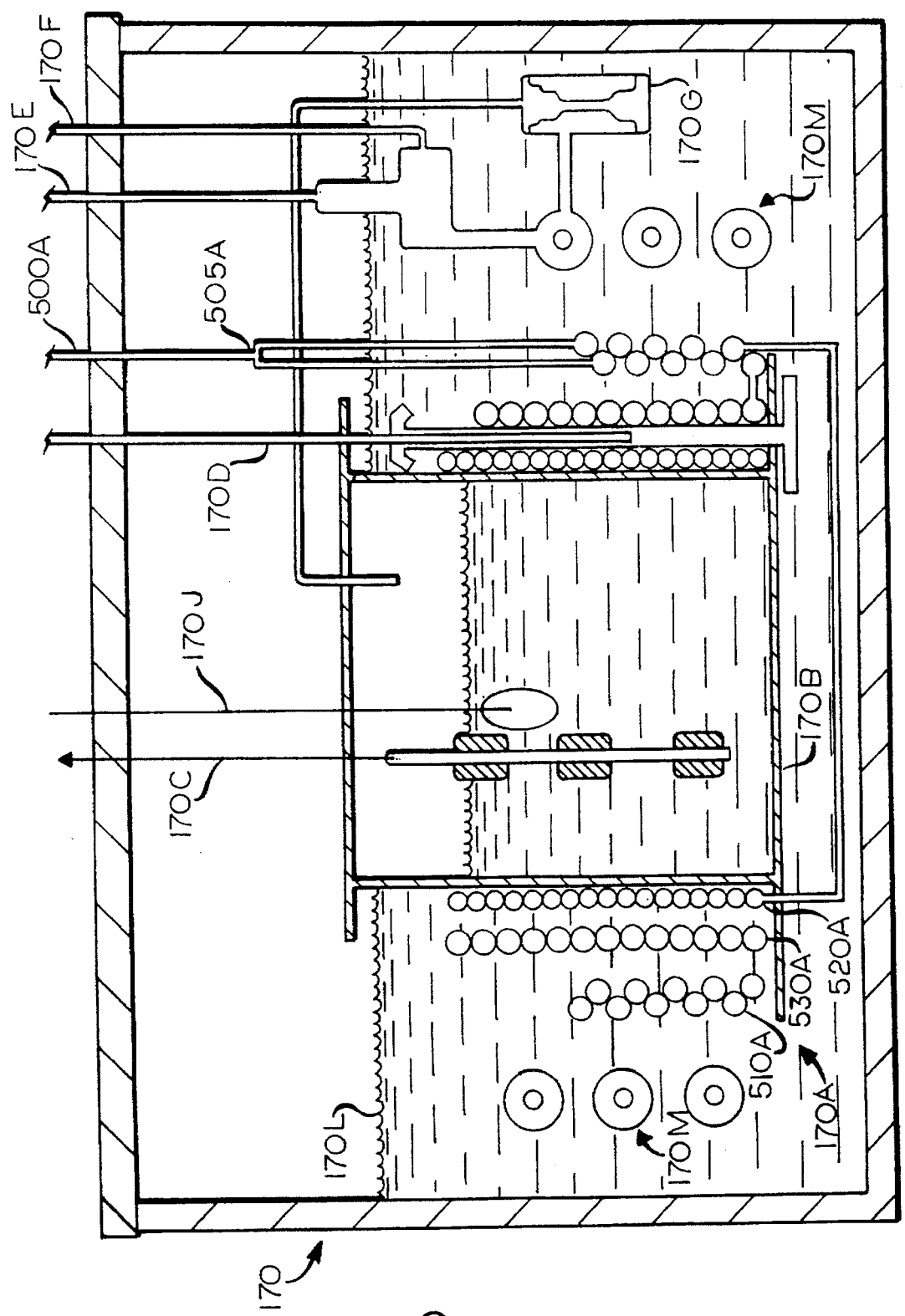
FIG. 5 is an elevation view of the heat exchanger unit and collection tank with liquid trap arrangement and flow control orifice taken along lines 5—5 of FIG. 3.

FIG. 3 is a top view of collection tank partition arrangement and process flow input and output arrangement of the invention. FIG. 4 is an elevation view of the heat exchanger unit 170A and collection tank 170B of condensing module 170 with input tube 550A with perforations 560A taken along lines 4—4 of FIG. 3. FIG. 5 is an elevation view of the heat exchanger unit 170A and collection tank 170B of condensing module 170 with liquid trap arrangement 170M taken along lines 5—5 of FIG. 3.

Referring now to FIGS. 3–5, incoming process flow enters condensing module 170 through input line 500A and into a tee arrangement 505A spliting the incoming process flow into in a dual circuit common layer arrangement when the process flow enters an outermost opposing flow circuit layer 510A of heat exchanger unit 170A. The process flow travels through the first layer of heat exchanger unit 170A in an opposing direction with respect to each circuit within flow circuit layer 510A. In addition, heat transfer between the incoming process flow is directed in the flow circuit layer 510A so as to initially occur in the lowermost volume of a heat transfer medium 170L. This initial transfer of heat decreases the viscosity and density of heat transfer medium 170L in a localized volume of heat transfer medium 170L.

Process flow travels from the outermost opposing flow circuit layer 510A and into two layers of heat exchange circuits 520A, 530A of heat exchanger unit 170A. The first heat exchange circuit 520A is located at the inner diameter of an eductor tube assembly 170K (described below) and the second heat exchange circuit 530A is located at the outer diameter of the eductor tube assembly 170K. Each heat exchange circuit of heat exchanger unit 170A rejoin at a tee arrangement 540A.

The length and diameter of tubing for each heat exchange circuit 520A, 530A is balanced with the design of the injection and eductor system 600 (described below) and the coolant used, such as $CO_2$, liquid nitrogen or other vaporizing inert refrigerant of sufficient cooling capacity, so that at the maximum design input pressure for the lowest boiling point temperature of all halocarbon compositions and the heat load into heat transfer medium 170L does not exceed the heat removal capacity of system 10. This is the major and important difference between the invention and other conventional systems.

As the process flow passes through heat exchanger unit 170A, the process flow is cooled by a liquid transfer medium 170L to liquefy the halocarbon composition. Liquid transfer medium 170L preferably comprises approximately 100% denatured alcohol. The denatured alcohol comprises approximately 90–95% by volume ethanol and 5–10% by volume methanol. This solution can be formulated to provide a freezing point of approximately −80° C. (−112° F.). Alternatively, the liquid transfer medium 170L may comprise 100% ethylene glycol mono-propyl ether. This solution can be formulated to provide a freezing point of approximately −90° C. (−130° F).

An injection and eductor system 600 positioned between heat exchange circuits 520A, 530A injects refrigerant, preferably liquid $CO_2$, through an injection tube 170D into the heat transfer medium 170L. The refrigerant cools heat exchanger unit 170A and collection tank 170B allowing for the separation of non-condensable gases from the residual liquid phase halocarbon. A thermocouple 170K is also located between heat exchange circuits 520A, 530A to measure the temperature of the liquid transfer medium 170L. As described in detail below, injection and eductor system 600, in conjunction with heat exchanger unit 170A, provides a highly efficient heat flow arrangement that minimizes consumption of refrigerant, such as $CO_2$, $N_2$, He and dry liquid air, and maximizes the process rate of the system 10.

Figure 6:
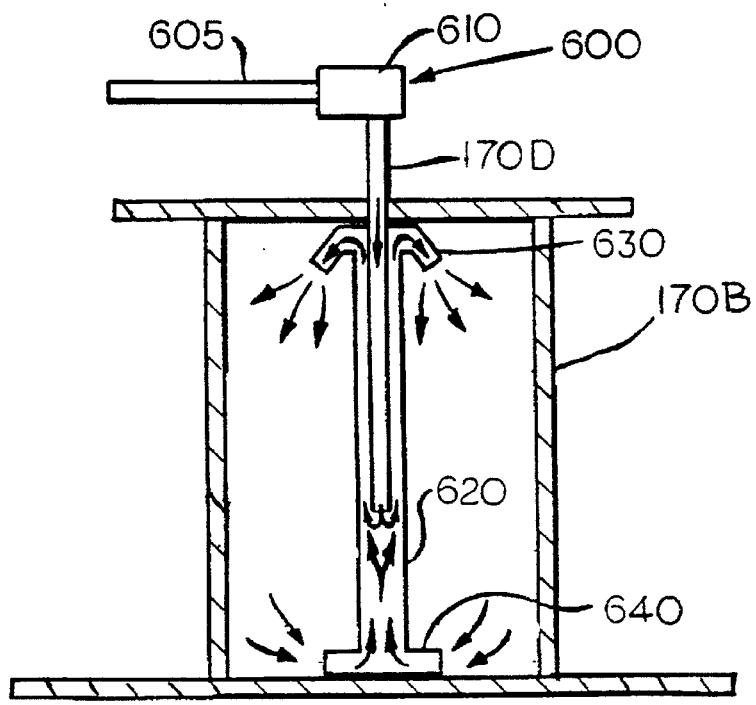
FIG. 6 is a diagram of the injection and eductor system for refrigerant injection into the heat transfer medium.

As shown in FIG. 6, injection and eductor system 600 comprises a liquid $CO_2$ source 605 injected into injection tube 170D using an injection solenoid valve 610. Injection tube 170D is disposed within a larger eductor tube assembly 620. Each injection tube 170D is positioned at two diagonally opposite corners of condensing module 170 in an opposed dual injection geometry between first and second heat exchange circuits 520A, 530A of heat exchanger unit 170A (FIG. 3). In the manner, at the inside diameter of each eductor tube assembly 620 is one halocarbon process circuit and at the outside diameter of each eductor tube assembly 620 is a separate heat exchanger circuit.

The vaporization of liquid $CO_2$ at the exit of the injection tube 170D creates counterflow currents within each eductor tube assembly 620 inducing an upward draft action through each eductor tube assembly 620. This updraft action, coupled with the discharge velocity at the top of each eductor tube assembly 620 and a down-turned exit nozzle arrangement 630, generates counterflow action within the heat transfer medium 170L drawing the warmer, less viscous and less dense, heat laden, heat transfer medium 170L into the inlet 640 located at the bottom of each eductor tube assembly 620. Thus, the heat transfer medium 170L, gives up its heat load in order to vaporize the liquid $CO_2$ at the point of injection within each eductor tube assembly 620.

Referring now to FIGS. 4 and 5, after leaving heat exchanger unit 170A, the process flow enters collection tank 170B of condensing module 170 by means of an input tube 550A. Collection tank 170B includes a perforated sheet arrangement comprising a plurality of internal partitions of perforated sheets 580A to enhance the removal of non-condensable gases from the liquid phase halocarbon. The perforated sheets are preferably made of stainless steel (SS304) and include perforations having a diameter of approximately 0.032 inches. The surface area of the perforations cover a surface area of approximately 20% of the stainless steel sheets 580A. The process stream from input tube 550A is imposed onto one side of a perforated sheet of the perforated sheet arrangement and mechanically agitates the liquid phase halocarbon within collection tank 170B. This mechanical agitation further removes non-condensable gases prior to the transfer of the collected liquid phase halocarbon from collection tank 170B.

Referring now to FIG. 4, input tube 550A includes perforations located in at least two distinct sections, an upper section 560A and a lower section 570A, relative to the level of liquid phase halocarbon within collection tank 170B. Input tube 550A is perforated in an upper section-560A and a lower section 570A for at least three reasons:

(1) Perforations in the lower section 570A of input tube 550A agitate the accumulated liquid phase halocarbon against the perforations 580A of the partitioned sheet arrangement enhancing gas separation during the release of pressure within the gas phase volume in the collection tank 170B, (2) Perforations in the upper section 560A of input tube 550A serve as a gas flow path to prevent reverse flow of liquid phase halocarbon into heat exchanger unit 170A during pressurization of collection tank 170B for the purpose of liquid transfer, and (3) Perforations in the upper section 560A of input tube 550A prevent liquid phase halocarbon backflow into heat exchanger unit 170A and provide an outflow of liquid phase halocarbon from the lower perforated section because the flow openings for the perforations in the upper section 560A are much smaller in cross-sectional area than the those of the lower section 570A. As a result, the liquid phase halocarbon does not prefer this path of escape during injection of the liquid phase halocarbon from heat exchanger unit 170A. In addition, the perforations in the upper section 560A of input tube 550A have an equivalent flow area of approximately 120% of the serial flow control orifice combination of flow control orifice 260 and flow control orifice 170G for permitting unrestricted vapor phase halocarbon flow into heat exchanger unit 170A during the liquid transfer cycle.

Referring now to FIG. 2, the halocarbon composition of liquid and vapor phase halocarbon and non-condensable gases collect in collection tank 170B. Thermocouple 170J located within the collection tank 170B measures the temperature of the halocarbon composition and sends a signal to a well-known computer means (not shown). Collection tank 170B fills with the halocarbon composition until a predetermined pressure of approximately 110 psi is indicated at pressure transducer 180. As collection tank 170B fills, the pressure within collection tank 170B is controlled by the activation of solenoid valve 200 at pressure transducer 180. This pressure increase is mainly due to non-condensable gas accumulation in collection tank 170B. Upon pressure transducer 180 indicating approximately 110 psi, solenoid valve 90 and the pump drive air solenoid valve (not shown) both close and solenoid valve 200 opens until pressure transducer 180 indicates approximately 30 psi.

Solenoid valve 200 closes at a predetermined pressure of approximately 30 psi. Solenoid valve 200 opens to release gas from collection tank 170B when the average temperature of collection tank 170B and heat transfer medium 170L is cooler than a predetermined temperature. For example, solenoid valve 200 opens at an average temperature of approximately −18° C. for the Halon® 1211 process. One skilled in the art should appreciate that each halocarbon composition requires unique operating parameters. The process of liquid phase halocarbon accumulation and gas separation continue until the liquid phase halocarbon activates the liquid transfer level on liquid level measurement system 170C.

Flow control orifice 170G is connected to a small outer diameter (OD) tube, approximately 0.25 inch, that is disposed within a much larger outer diameter (OD) tube, approximately 0.75 inch, forming an inner and outer chamber, respectively. Thus, the arrangement of these two tubes form a coaxial, helical liquid trap arrangement 170M. For good heat transfer characteristics, the tubes of liquid trap arrangement 170M are preferably made of copper material. Flow control orifice 170G removes vapor phase halocarbon from the vapor stream mixture because a pressure drop generated by flow control orifice 170G further cools the vapor stream mixture and allows for further recovery of residual liquid phase halocarbon from the vapor phase. The residual liquid phase halocarbon collects in the lower portion of liquid trap arrangement 170M and returns to collection tank 170B during the liquid transfer mode discussed later.

The arrangement of the flow control orifice 170G and the flow control orifice 210, in conjunction with the heat exchanger unit 170A, form a predetermined pressure balancing circuit. Specifically, the pressure at pressure transducer 180 decreases in magnitude more rapidly than the pressure at pressure transducer 160 because the flow diameter of flow control orifice 210 is larger than the flow diameter of flow control orifice 170G. As a result, the rate of the pressure drop that occurs at pressure transducer 180 allows the solenoid valve 140 to remain open during gas separation. This action further enhances the removal of dissolved gas content in the halocarbon composition by permitting the residual liquid phase halocarbon within the lower portion of the heat exchanger unit 170A to enter the collection tank 170B during gas separation, thereby increasing the overall efficiency of the system 10.

Liquid level measurement system 170C indicates that liquid phase halocarbon is at the liquid transfer level when the uppermost sensor senses liquid phase halocarbon. When the liquid level is at the liquid transfer level in collection tank 170B, solenoid valves 90 the pump drive air solenoid valve (not shown), and solenoid valve 140 close. Solenoid valve 200 opens releasing pressure from the collection tank 170B through flow control orifice 170G, flow control orifice 210 and through exhaust silencer 220 of a type well known in the art. Solenoid valve 200 will not open if the average temperature of the collection tank 170B and heat exchanger unit 170A is warmer than a predetermined temperature. For example, solenoid valve 200 will not open if the average temperature is warmer than approximately −18° C. for the Halon® 1211 process.

During gas separation, additional halocarbon composition is captured by flow through flow control orifice 170G. Solenoid valve 200 remains open until pressure transducer 160 indicates a predetermined pressure of approximately 2 psi. This pressure indicates the content of the residual non-condensable gas, typically nitrogen, within the halocarbon composition transferred from collection tank 170B to storage container or receiver 350. The content of the residual non-condensable gas can be determined by comparing the partial pressure difference between the vapor pressure of the halocarbon composition at the separation temperature and the gas separation closure pressure controlled by pressure transducer 160.

When pressure transducer 160 actuates at low pressure during the gas separation cycle and liquid level measurement system 170C indicates liquid transfer level, liquid transfer mode begins. Solenoid valve 200 closes and solenoid valves 240 and 300 open. Transfer gas 280, typically nitrogen, from transfer gas cylinder (not shown) flows through relief valve 270, through flow control orifice 260 and into the collection tank 170B through the larger outside diameter tube of the liquid trap arrangement 170M. The accumulated liquid phase halocarbon returns from liquid trap arrangement to collection tank 170B by way of flow control orifice 170G. The pressure increase in collection tank 170B forces the liquid phase halocarbon out of collection tank 170B, through syphon tube output line 170H, through output hand valve 290, through solenoid valve 300, through check valve 310, past relief valve 320, past pressure transducer 330, through output hose 340 and into receiving tank 350.

During liquid transfer mode, liquid phase halocarbon is transferred into receiving tank 350. The amount of halocarbon transferred depends on the halocarbon composition being processed and how much halocarbon composition is captured in liquid trap arrangement 170M. Approximately 50 pounds of liquid phase halocarbon, or approximately 665 cubic inches of halocarbon composition are transferred for the Halon® 1211 process. The liquid transfer mode is deactivated at the end of transfer gas release when pressure transducer 160 indicates a predetermined low pressure of approximately 30 psi. Pressure transducer 160 monitors pressure within collection tank 170B to control transfer gas flow through solenoid valve 240. Solenoid valve 240 closes when pressure transducer 160 indicates a predetermined pressure. For example, solenoid valve 240 closes when pressure transducer 160 indicates a pressure of approximately 150 psi for the Halon® 1211 process. Solenoid valve 240 opens when pressure transducer 160 indicates a predetermined pressure. For example, solenoid valve 240 opens when pressure transducer 160 indicates a pressure of approximately 130 psi for the Halon® 1211 process. This maintains the energy required for transferring the liquid phase halocarbon to the receiver 350 under worst case conditions (i.e., high ambient temperature conditions) for that particular halocarbon composition process.

Liquid transfer mode continues until a low liquid level position is actuated by liquid level measurement system 170C or until a predetermined time limit, typically 150 seconds, have elapsed since the opening of solenoid valve 300. A low liquid level position occurs when liquid phase halocarbon is no longer sensed at the bottom most sensor of liquid level measurement system 170C. Upon a time lapse of 150 seconds, for example, system 10 may exit the liquid transfer mode by means of a well-known processor. In addition, diagnostics may be displayed to the operator and the recovery operation of system 10 may be halted.

Liquid level measurement system 170C indicates low liquid level when the bottommost sensor no longer indicates a liquid phase halocarbon. When low liquid level is indicated, solenoid valves 240 and 300 close. Solenoid valve 200 then opens releasing the transfer gas through flow control orifice 210 and exhaust silencer 220. Solenoid valve 200 remains open until pressure transducer 160 indicates approximately 30 psi. Upon pressure transducer 160 indicating approximately 30 psi during venting of the transfer gas, system 10 resumes recovery operation.

Figure 7:
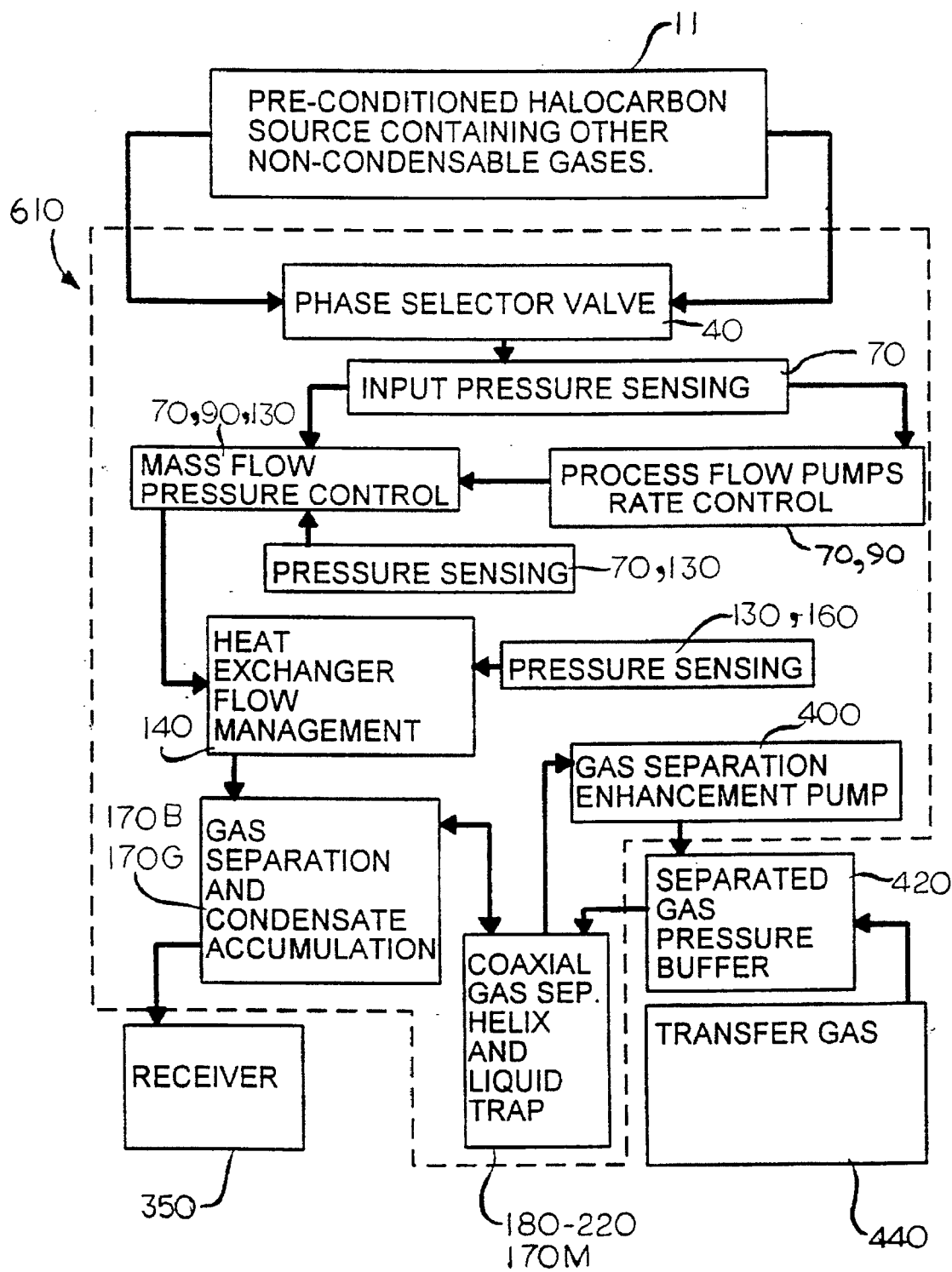
FIG. 7 is a block diagram of a second embodiment of the high rate and highly process efficient halocarbon recovery and non-condensable gas separation system.
Figure 8:
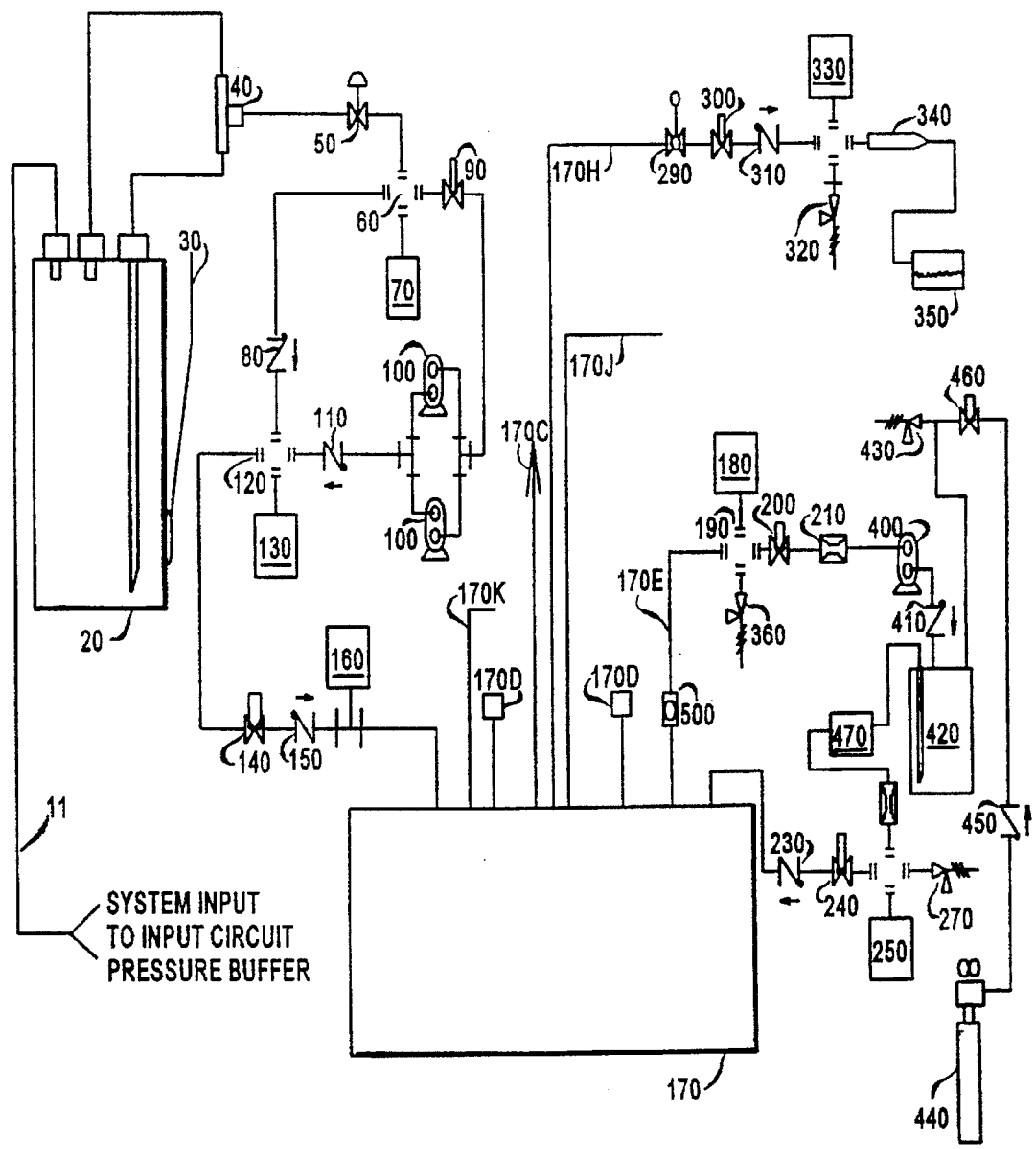
FIG. 8 is a more detailed schematic diagram of the high rate and highly process efficient halocarbon recovery and non-condensable gas separation system of FIG. 7.

FIGS. 7 and 8 show a block diagram and a detailed schematic diagram, respectively, of the high rate, high efficiency halocarbon recovery and non-condensable gas separation system according to a second preferred embodiment of the invention.

In the second preferred embodiment, the system 610 recovers halocarbon compositions and non-condensable gases similar to the first embodiment of the invention. For convenience, similar reference numerals in the descriptions of the two embodiments indicate corresponding components.

However, instead of the output from gas separation being directed through exhaust silencer 220 as in the first preferred embodiment, the output from gas separation is directed to a pump means or pump 400. Pump 400 compresses the output and feeds the compressed gases from gas separation through a check valve 410 into a cylinder 420. The pressure in cylinder 420 is maintained at a predetermined pressure of at least 50 psi above the minimum deactivation pressure (approximately 150 psi for the Halon® 1211 process) required for solenoid valve 230 to close as sensed by pressure transducer 180. It should be understood that the deactivation pressure varies for each halocarbon composition being processed by system 610.

Excess pressure within cylinder 420 is directed through relief valve 430. The actuation pressure and re-seat pressure of relief valve 430 is such that relief valve 430 opens prior to exceeding a safe working pressure (approximately 500 psi) of the cylinder 420. In this manner, any liquid phase halocarbon that may enter cylinder 420 remains as liquid phase due to the pressure within the cylinder 420 being well above the vapor pressure of the halocarbon composition under worst case ambient conditions.

In the case when the halocarbon composition is void of non-condensable gases, the pressure within collection tank 170B may not increase to a sufficient amount to activate solenoid valve 200. In this situation, there may not be sufficient transfer gas supply in the cylinder 420 for transferring the liquid phase halocarbon into receiver 350. In this instance, the computer control software may be instructed by the operator to open solenoid valve 460 permitting transfer gas makeup supply 440 to charge cylinder 420 to a predetermined value determined by pressure transducer 250 through pressure regulator 470. For example, pressure regulator 470 may be set by the operator to a predetermined pressure of approximately 150 psi for the Halon® 1211 process. It should be appreciated by those skilled in the art that the pressure setting for pressure regulator 470 may vary for each halocarbon composition process.

The liquid phase halocarbon collected within cylinder 420 is returned through the outer diameter and heat exchange surface of liquid trap arrangement 170M (FIGS. 3 and 5) and passes through flow control orifice 170G. This does not sufficiently disturb the liquid phase surface area to cause any excess non-condensable gas to re-dissolve within the liquid phase being transferred to receiver 350.

Hereafter, system 610 continues the recovery of the halocarbon composition similar to system 10 of the first preferred embodiment of the invention.

System 610 of the second preferred embodiment offers advantages over system 10 of the first preferred embodiment. For instance, system 10 of the second preferred embodiment protects from accidental atmospheric discharge of liquid phase halocarbon. In system 10 of the first preferred embodiment, if solenoid valve 200 fails to close and the sensing of the liquid level by the liquid level measurement system 170C fails, then condensate tank 170B may fill with liquid phase halocarbon that can be vented to the atmosphere. However, in system 610 of the second preferred embodiment, the liquid phase halocarbon directed through solenoid valve 200 is captured by cylinder 420. It should be understood by those skilled in the art that the system 610 may also include an alarm (not shown) to indicate to the operator an abnormal time rate of change of the liquid level measured by the liquid level measurement system 170C and also to warn the operator to check the visual indicator 500 for the presence of liquid phase halocarbon. Should liquid phase halocarbon be observed, the operator may actuate the liquid transfer command at a user interface panel on a computer control device (not shown). Should the excessive recovery time alarm fail to be observed by the operator after a period of time, the computer control system may halt the recover process until acknowledgment of the condition is entered at the user interface panel.

While this invention has been described in conjunction with specific embodiments, it is evident that many alternatives, modifications and variations will be apparent to those skilled in the art. Accordingly, the preferred embodiments of the invention as set forth herein are intended to be illustrative, rather than limiting. Various changes may be made without departing from the spirit and scope of the invention as defined in the following claims.

What is claimed is:

1. A system for removal of non-condensable gases from a halocarbon composition, comprising:

a condensing module filled with a heat transfer medium;

an injection and eductor system for cooling the heat transfer medium by injecting refrigerant into the heat transfer medium;

a heat exchanger unit submerged in the heat transfer medium for cooling a halocarbon composition, the halocarbon composition comprising liquid and vapor phase halocarbon and non-condensable gases;

a collection tank integral with the heat exchanger unit for collecting liquid phase halocarbon;

a separator mechanism for separating vapor phase halocarbon from the vapor stream mixture including vapor phase halocarbon and non-condensable gases from said collection tank;

an inlet device for transporting the liquid phase halocarbon from said heat exchanger unit to said collection tank; and a receiver for receiving the liquid phase halocarbon from said collection tank.

2. The system according to claim 1, wherein said injection and eductor system comprises a solenoid valve connected to an injection tube disposed within an eductor tube assembly.

3. The system according to claim 2, wherein said injection and eductor system includes a pair of eductor tube assemblies arranged in an opposed dual injection geometry, each eductor tube assembly being positioned at two diagonally opposite corners of the collection tank.

4. The system according to claim 3, wherein said eductor tube assembly is positioned between two separate heat exchange circuits of said heat exchanger unit.

5. The system according to claim 1, wherein said separator mechanism comprises a flow control orifice connected to a small diameter tube disposed within a larger diameter tube forming a coaxial, helical liquid trap arrangement.

6. The system according to claim 5, wherein said separator mechanism further comprises:

a pump for compressing the non-condensable gases released from the vapor stream mixture; and a cylinder for storing the non-condensable gases released from the vapor stream mixture.

7. The system according to claim 1, wherein said collection tank includes a perforated sheet arrangement.

8. The system according to claim 7, wherein said perforated sheet arrangement comprises a plurality of internal partitions of perforated sheets for enhancing removal of the non-condensable gases from the liquid phase halocarbon.

9. The system according to claim 1, wherein said inlet device comprises an input tube disposed within the collection tank, said input tube including a plurality of perforations in upper and lower sections of said input tube for mechanically agitating the halocarbon composition, thereby enhancing removal of the non-condensable gases from the halocarbon composition.

10. A system for recovery of halocarbon and removal of non-condensable gases from a vapor stream mixture including vapor phase halocarbon and non-condensable gases, the system comprising:

a condensing module filled with a heat transfer medium;

a heat exchanger unit immersed in the heat transfer medium, said heat exchanger unit comprising a heat exchanger for cooling halocarbon composition and a collection tank integral with the heat exchanger for collecting liquid phase halocarbon; and a separator mechanism for separating vapor phase halocarbon from the vapor stream mixture, said separator mechanism comprising a flow control orifice disposed in the vapor stream mixture connected to a small diameter tube disposed within a larger diameter tube forming a coaxial, helical liquid trap arrangement.

11. The system according to claim 10, wherein said separator mechanism causes a pressure of the vapor stream mixture to decrease, thereby further cooling the vapor stream mixture and enhancing a process efficiency of the system.

12. The system according to claim 10, wherein said separator mechanism further comprises:

a pump for compressing the non-condensable gases released from the vapor stream mixture; and a cylinder for storing the non-condensable gases released from the vapor stream mixture.

13. The system according to claim 10 further comprising an inlet device for transferring liquid phase halocarbon from the heat exchanger unit into the collection tank.

14. The system according to claim 13, wherein said inlet device comprises an input tube disposed within the collection tank, said input tube including a plurality of perforations in upper and lower sections of said input tube for mechanically agitating the halocarbon composition, thereby enhancing removal of the non-condensable gases from the halocarbon composition.

15. The system according to claim 14, wherein the at least two distinct sections comprise an upper perforated section and a lower perforated section.

16. The system according to claim 15, wherein the upper and lower perforated sections include flow openings, the flow openings of the upper perforated section having a smaller cross-sectional area than the flow openings of the lower perforated section.

17. The system according to claim 16, wherein the upper perforated section of said input tube prevent backflow of liquid phase halocarbon into the heat exchanger unit.

18. The system according to claim 16, wherein the lower perforated section of said input tube provides an outflow of liquid phase halocarbon into the heat exchanger unit.

19. The system according to claim 10, wherein said collection tank includes a plurality of internal partitions of perforated sheets for enhancing removal of the non-condensable gases from the liquid phase halocarbon.

20. The system according to claim 10 further comprising an injection and eductor system for injecting refrigerant into the heat transfer medium, thereby cooling the heat exchanger unit and the collection tank.

21. The system according to claim 20, wherein said injection and eductor system comprises a solenoid valve connected to an injection tube disposed within an eductor tube assembly.

22. The system according to claim 21, wherein said injection and eductor system includes a pair of eductor tube assemblies arranged in an opposed dual injection geometry, each eductor tube assembly being positioned at two diagonally opposite corners of the collection tank.

23. The system according to claim 22, wherein each eductor tube assembly is positioned between two separate heat exchange circuits of the heat exchanger.

24. A method for recovery of halocarbon compounds and removal of non-condensable gases from a halocarbon composition including vapor phase halocarbon and non-condensable gases, the method comprising the steps of:

filling a condensing module with a liquid heat transfer medium;

submerging a heat exchange unit and a collection tank integral with the heat exchanger unit in the liquid heat transfer medium;

transferring the halocarbon composition from a halocarbon composition source into the collection tank;

cooling the heat exchange unit and the liquid heat transfer medium;

liquefying the vapor phase halocarbon in the collection tank forming liquid phase halocarbon;

separating residual liquid phase halocarbon from a vapor stream mixture including vapor phase halocarbon and non-condensable gases by further cooling the vapor stream mixture using a flow control orifice in combination with a liquid trap arrangement;

transferring the residual halocarbon liquid phase from the liquid trap arrangement into the collection tank; and transferring the liquid phase halocarbon from the collection tank into a receiver.

25. The method according to claim 24, further comprising the step of mechanically agitating the halocarbon composition and preventing back flow of the halocarbon composition into the heat exchanger unit by using a perforated input tube, thereby enhancing removal of the non-condensable gases.

26. The method according to claim 24, further comprising the step of cooling the heat transfer medium by injecting refrigerant into the heat exchanger unit using an injection and inductor system.

\* \* \* \* \*